United States Patent Office 3,211,994
Patented Oct. 12, 1965

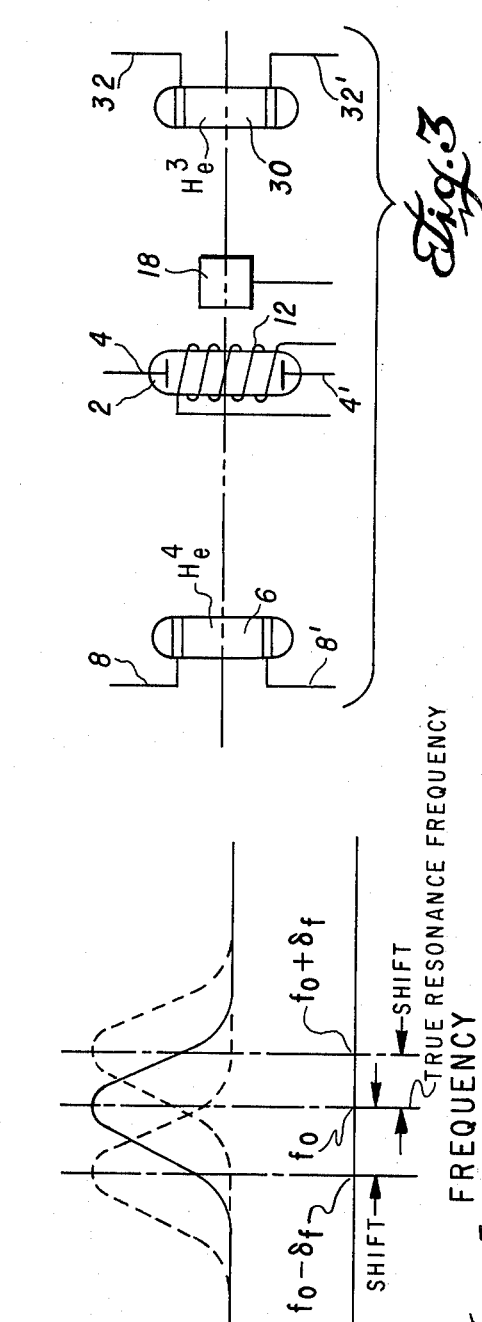
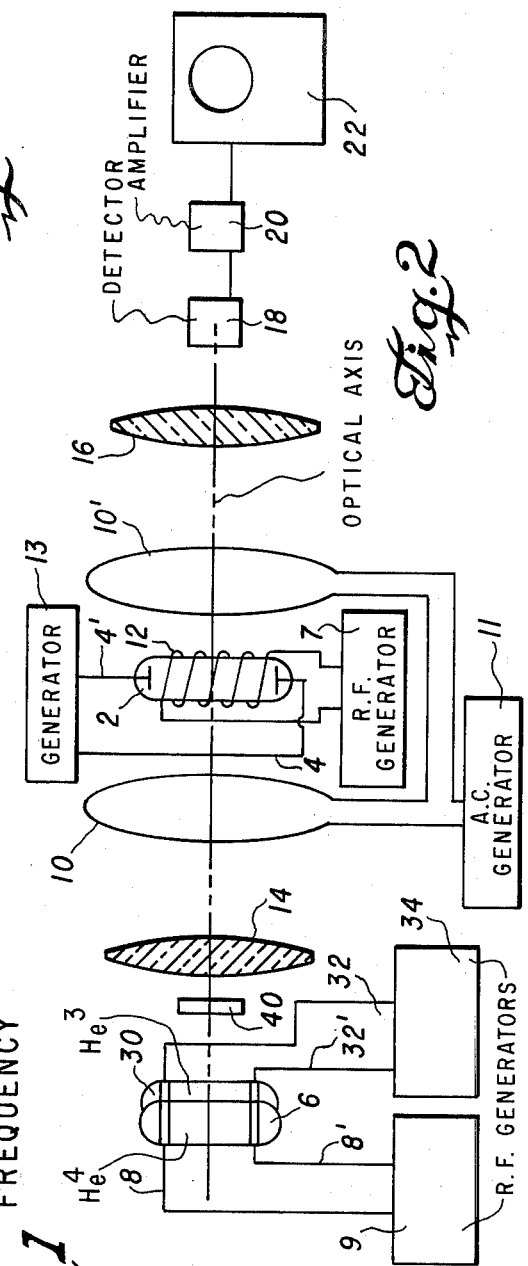
FORREST D. COLEGROVE, JR.
LAIRD D. SCHEARER
INVENTOR

3,211,994
RESONANCE LINE SHIFT COMPENSATED RE-
TRACTABLE HELIUM MAGNETOMETER
Forrest D. Colegrove, Jr., Dallas, and Laird D. Schearer,
Richardson, Tex., assignors to Texas Instruments In-
corporated, Dallas, Tex., a corporation of Delaware
Filed Feb. 13, 1962, Ser. No. 173,021
9 Claims. (Cl. 324—.5)

The present invention relates to helium gas magnetometers, and more particularly to an improved helium gas magnetometer for measuring small changes in an ambient magnetic field.

Helium gas magnetometers have been developed to a high degree of accuracy for measuring the absolute value of an ambient magnetic field in which the magnetometer is positioned. Of equal or greater importance, however, is the ability of a magnetometer to measure extremely small changes in the ambient magnetic field so as to detect disturbances in the field, such detection having obvious utility in military applications, prospecting, or the like. To provide complete versatility to the magnetometer, it should be capable of accurately measuring these small changes even though the magnetometer is moved about, rotated, or reoriented with respect to the direction of the magnetic field, as it would when carried in an airplane, vessel, or other conveyance.

It is, therefore, an object of this invention to provide an improved magnetometer which is capable of accurately measuring extremely small changes in an ambient magnetic field in which the magnetometer is positioned regardless of the motion, orientation or rotation thereof while making the measurements.

It is another object of the invention to provide a helium gas magnetometer that is capable of measuring changes in said ambient magnetic field which are much smaller than magnetometers heretofore have been capable of measuring.

Other objects, features and advantages will readily become better understood from the following description of illustrative examples when taken in connection with the appended claims and the attached drawing wherein like numerals refer to like parts throughout, and in which:

FIGURE 1 is an illustrative graphical representation of the resonance signal derived from the magnetometer in terms of the intensity of resonance radiation striking the detector as a function of the frequency of the R.F. magnetic field, as hereinafter described;

FIGURE 2 is a schematic illustration of one embodiment of a helium gas magnetometer showing an improvement according to the invention; and FIGURE 3 is a schematic illustration showing only pertinent parts of another embodiment of the invention.

The present invention provides an improvement in helium magnetometers of the type utilizing the phenomenon of optically pumping metastable $2^3S_1$ helium atoms with circularly polarized resonance radiation. The operation of the helium magnetometer and discussions of the phenomenon of optically pumping metastable $2^3S_1$ helium atoms are fully disclosed and described in Patent No. 3,122,702, issued February 25, 1964, in the publication, Advances in Quantum Electronics, edited by J. R. Singer, p. 239, Columbia University Press, 1961, and in the publication, A Metastable Helium Magnetometer for Observing Small Geomagnetic Fluctuations, by A. R. Keyser, J. A. Rice, and L. D. Schearer, The Journal of Geophysical Research, vol. 66, No. 12, Dec. 1961, pp. 4163–4169.

It has been found that the helium magnetometer as described in the above-noted references is orientation dependent with respect to the extent that an energy "shift" in the magnetic sublevels of the helium metastable $^3S_1$ atoms occurs when the resonance radiation from the helium lamp is incident on such atoms. This shift in the sublevels manifests itself as an inaccuracy in the measurement of the ambient magnetic field in which the magnetometer is positioned in the form of an alteration of the true resonant frequency. If the magnetometer is used to measure changes in the ambient magnetic field in which the magnetometer is permanently fixed to have a single orientation with respect to said magnetic field, the shift in the magnetic sublevels caused by the impinging resonance radiation on the metastable $^3S_1$ atoms does not affect the accuracy of measurement. If, however, the magnetometer is moved, rotated or reorientated in any manner, an alteration of the resonance frequency to a higher or lower value occurs as a consequence of changing the direction of propagation of the resonance radiation with respect to the ambient magnetic field direction. The following description will be helpful in understanding the observed results of the behavior of a magnetometer when this "shift" occurs.

When the absorption cell of the magnetometer containing metastable $^3S_1$ helium atoms is subjected to resonance radiation from a helium lamp, it is ordinarily assumed that the radiation (hereinafter referred to as emission lines) emitted as a result of transitions from the $2^3P$ states to the three magnetic sublevels of the metastable $2^3S_1$ state has the same center frequency as the center frequency of the radiation required to cause transitions from the three magnetic sublevels of the $2^3S_1$ state to the $2^3P$ states within the absorption cell (hereinafter referred to as the absorption line). The center frequency as used above refers to the mean frequency of all the transitions (either emission or absorption) according to the respective probabilities of transitions. If the foregoing assumption is correct, viz. that the center frequency of the emission lines is the same as the center frequency of the absorption line, no shift in the magnetic sublevels of the helium metastable $2^3S_1$ state occurs, and no inaccuracy in the measurement of the magnetic field is recorded, the resonance frequency determination by the magnetometer being unaffected and representing the true magnetic field.

In actuality, the lamp generating the resonance radiation is "hotter" than the absorption cell, in the sense that the discharge is more intense, and the pressure of the helium atoms therein is greater than those of the absorption cell, so that a higher efficiency of operation may be obtained, meaning a greater degree of alignment or polarization of the metastable helium atoms. The increased intensity and pressure of atoms within the lamp produces an increase in the frequency of the spectral lines of the helium, and as a consequence, the center frequency of the emission line is shifted to a higher value. This means that the center frequency of the emission line is greater than that of the absorption line, the difference between them causing a "shift" in the energy of the magnetic sublevels of the metastable $2^3S_1$ atoms within the absorption cell upon being subjected to the resonance radiation. The relative shifts of each magnetic sublevel of this state are different, that is, each of the sublevels is shifted by a different amount. As a result, the resonance line as recorded by the magnetometer is shifted slightly, the resonance line being that frequency of the R.F. magnetic field which is directly proportional to the ambient magnetic field causing the energy splitting of the metastable state. In other words, because of the shift in the resonance line, the magnetometer output is not that due to the true value of the ambient magnetic field, but rather, the resonance line frequency is slightly higher as a consequence of the error introduced by shifting the magnetic sublevels of the metastable helium atoms to slightly higher energies.

It has been found that the amount of the shift of these sublevels is very nearly proportional to the intensity of the resonance radiation impinging on the helium atoms within the absorption cell. Moreover, the shift is increased by increasing the helium pressure within the helium lamp (causing a greater difference in the center frequencies of the emission and absorption lines) used to produce the resonance radiation. Other observed results are the shifting of the resonance frequency to a value higher than its true value when the resonance radiation is circularly polarized in a right-handed direction (magnetic vector rotating in a clockwise direction as viewed along the direction of propagation of the resonance radiation) and shifting the resonance frequency to a value lower than its true value when the resonance radiation is circularly polarized in a left-handed direction, as shown in FIGURE 1.

The invention as described below in detail provides means for reducing, eliminating or compensating for this shift to impart higher accuracy to the helium magnetometer. In terms of accuracy this invention permits the measurement of a *change* in the ambient magnetic field of about 0.1 micro-gauss, this value corresponding to a resonance frequency change (or change in magnetic sublevels of the metastable helium atoms caused by the ambient magnetic field) of about 0.3 cycle per second. This change can be measured with an error of about plus or minus 0.15 c.p.s. It makes no difference what the absolute magnitude of the ambient magnetic field is, since the absolute magnitude has no bearing on the amount by which the magnetic sublevels are shifted by the resonance radiation. Without the use of the invention, however, the shifts of the magnetic sublevels would cause an error in measurements of changes of the magnetic field as high as 50 c.p.s. Although a 50 c.p.s. error in the measurement of the absolute value of a magnetic field of, for example, 0.5 gauss (corresponding to about $1.5 \times 10^6$ c.p.s.), is negligible, this much error introduced in measuring small changes in the field can completely obscure any meaningful result, as indicated in the example above. Thus the invention is a vast improvement as a means to increase the accuracy of metastable helium magnetometers, as described below.

It has been found that by subjecting the helium atoms within the absorption cell not only to resonance radiation from an $He^4$ discharge, but additionally to radiation from an $He^3$ discharge, the shift produced in the magnetic sublevels of the helium metastable $2^3S_1$ state atoms within the absorption cell is reduced or eliminated. The reason is that the center frequency of the emission line from $He^3$ is lower than the center frequency of the absorption line of the atoms within the absorption cell. Therefore, as the resonance radiation from the $He^4$ lamp tends to shift the magnetic sublevels to higher energies, the resonance radiation from the $He^3$ lamp tends to shift them to lower energies. Under proper conditions of which examples are given below, the net shift can be substantially reduced or eliminated.

Referring to FIGURE 2 there is shown an absorption cell 2 containing pure $He^4$ gas, the cell having electrodes 4 and 4' connected to a generator 13 for creating a discharge within the cell to maintain a given density of metastable $2^3S_1$ state atoms. A helium lamp 6 containing pure $He^4$ gas and having electrodes 8 and 8' connected to an R.F. generator 9 is positioned adjacent the cell 2 as a source of resonance radiation, so that the resonance radiation can pass into and through the absorption cell. An infrared detector 18 is positioned along an optical axis with the lamp and cell so that resonance radiation from the lamp passing through the cell is detected thereby. The output signal from the detector is applied to an indicating means, such as an oscilloscope 22, through an amplifier 20. Lenses 14 and 16 may be used for focusing the light on the cell from the lamp and focusing the light transmitted through the cell on the detector. A circular polarizer 40 is positioned between the lamp 6 and cell 2 to polarize the resonance radiation in whatever direction desired. Helmholtz coils 10 and 10' are used to modulate the ambient magnetic field H so that the signal derived from the detector may be visually displayed on the oscilloscope 22. An R.F. magnetic coil 12 is positioned about the cell and connected to an R.F. generator 7 for subjecting the helium atoms within the cell to a magnetic field of resonance frequency. A complete description of the theory and operation of the magnetometer is given in the above-noted references.

By positioning another lamp containing pure $He^3$ adjacent the absorption cell and subjecting the helium atoms within the cell to resonance radiation therefrom simultaneously with resonance radiation from the $He^4$ lamp, the shift above referred to is reduced or eliminated. As shown in FIGURE 2, the $He^3$ lamp 30 having electrodes 32 and 32' connected to an R.F. generator 34 for creating a discharge therein is positioned adjacent the $He^4$ lamp for simplicity. However, as shown in FIGURE 3 (only pertinent parts shown), the $He^3$ lamp may be positioned on the opposite side of the cell from the $He^4$ lamp. In fact, the relative positions of the $He^3$ and $He^4$ lamps are not critical.

Illustrative of operating conditions when using separate $He^3$ and $He^4$ lamps according to the invention is as follows: For a pressure of about 1 mm. of Hg within the $He^4$ lamp 6 and a pressure of about 8 mm. of Hg within the $He^3$ lamp 30, with a ratio of intensities of the $He^4$ resonance radiation to the $He^3$ resonance radiation of about 3 to 1, the shift in the magnetic sublevels of the metastable helium atoms within the absorption cell can be eliminated. This is true regardless of the relative positions of the $He^3$ and $He^4$ lamps, as noted with references to FIGURES 2 and 3. These relative pressures and intensities are not critical but provide suitable results.

Another means for providing a source of resonance radiation from a $He^3$ discharge is to contain both $He^3$ and $He^4$ gas within the lamp 6. It is not as easy to completely eliminate the shift by having a common vessel for $He^3$ and $He^4$, but this configuration simplifies the magnetometer. Illustrative conditions for operation are as follows: For a mixture of about .1 $He^3$ to $He^4$ gas by volume, the pressure within the tube being about 1–2 mm. of Hg, a reduction in shift of about 20% is observed from the case where no $He^3$ is utilized. This particular pressure range and relative amounts of $He^3$ and $He^4$ is not critical but provide a substantial reduction in the shift.

In addition to the above means for reducing or eliminating the shift, the pressure of $He^4$ within the lamp used as the source of resonance radiation can be reduced below the normal pressure used, the result being a decrease in the shift. This is because of the effect that the pressure has on the changing of the center frequency of the emission line as above noted. In some instances it is desirable to use a single lamp containing only $He^4$ gas, in which case, the pressure therewithin is maintained at a relative small value to reduce the shift. Illustrative of the pressure range that will reduce the shift substantially is in the range of from 2 mm. of Hg or less. Thus in detecting very small variations of an ambient magnetic field, the pressure within the lamp is maintained below this value.

It should be noted that in the example above describing separate $He^3$ and $He^4$ lamps, the pressure maintained in the $He^4$ lamp is below 2 mm. of Hg. Thus a combination of the two effects, viz. reduced pressure in the $He^4$ lamp and simultaneous resonance radiation from the $He^3$, is advantageously used. In fact, it is difficult to observe any pronounced reduction in the shift of the resonance frequency by using the additional $He^3$ lamp unless the intensity of the resonance radiation therefrom is large compared with that of the $He^4$ lamp or the pressure in the $He^4$ lamp is reduced below that normally used in an $He^4$ metastable helium magnetometer. Reducing the pressure in the $He^4$ lamp and using the additional $He^3$ lamp therefor yields results not obtainable by using either of the effects separately.

Although the invention has been described with reference to illustrative examples, modifications and substitutions will become apparent to those skilled in the art that do not depart from the true scope of the invention as defined by the appended claims.

What is claimed is:

1. In a helium gas magnetometer having an absorption cell containing $He^4$ metastable $2^3S_1$ atoms and a first lamp containing substantially pure $He^4$ gas for providing a source of resonance radiation impinging on the metastable atoms within said cell, the improvement comprising said first lamp containing said $He^4$ gas at a pressure greater than zero but less than 2 mm. of Hg, and a second lamp containing substantially pure $He^3$ gas at a pressure of about 8 mm. of Hg for providing a source of resonance radiation impinging on the metastable atoms within said cell, said first and second lamps operating simultaneously to eliminate the shift in magnetic sublevels of the metastable helium atoms.

2. In a helium gas magnetometer according to claim 1, including means for operating said first and said second lamps to cause the intensity of the resonance radiation from said first lamp impinging on said metastable atoms within said absorption cell to be greater than the intensity of the resonance radiation from said second lamp impinging on said metastable atoms within said absorption cell.

3. In a helium gas magnetometer having an absorption cell containing $He^4$ metastable $2^3S_1$ atoms and a first lamp containing substantially pure $He^4$ gas for providing a source of resonance radiation impinging on said metastable atoms within said cell, the improvement comprising said first lamp containing said $He^4$ gas at a pressure greater than zero but less than 2 mm. of Hg, a second lamp containing substantially pure $He^3$ gas for providing a second source of resonance radiation impinging on said metastable atoms within said cell, the pressure within said second lamp being greater than 2 mm. of Hg, and means for operating said first and said second lamps to cause the intensity of the resonance radiation from said second lamp to be less than the intensity of the resonance radiation from said first lamp.

4. In a helium gas magnetometer having an absorption cell containing $He^4$ metastable $2^3S_1$ atoms and a lamp containing substantially pure $He^4$ gas for providing a source of resonance radiation impinging on said metastable atoms within said cell, the improvement comprising said lamp containing said $He^4$ gas at a pressure greater than zero but less than 2 mm. of Hg.

5. In a helium gas magnetometer having an absorption cell containing $He^4$ metastable $2^3S_1$ atoms and a first lamp containing substantially pure $He^4$ gas for providing a source of resonance radiation impinging on said metastable atoms within said cell, the improvement comprising a second lamp containing substantially pure $He^3$ gas at a pressure of about 8 mm. of Hg for providing a source of resonance radiation impinging on the metastable atoms within said cell, said first and second lamps operating simultaneously to eliminate the shift in the magnetic sublevels of the metastable helium atoms.

6. In a helium gas magnetometer having an absorption cell containing $He^4$ metastable $2^3S_1$ atoms and a lamp providing a source of resonance radiation impinging on said metastable atoms within said cell, the improvement comprising said lamp containing both $He^3$ gas and $He^4$ gas in a ratio of about .1 $He^3$ gas to $He^4$ gas at a pressure of about 2 mm. of Hg or less to effect a several percent reduction in the resonance frequency shift derived from said absorption cell as a result of rotation of said magnetometer over the resonance frequency shift caused by resonance radiation impinging on said cell from a lamp containing only one of said $He^3$ gas and $He^4$ gas in substantially pure form.

7. The improvement as defined in claim 6 wherein said lamp contains about 1.0 part $He^3$ gas to 10 parts $He^4$ gas by volume at a pressure greater than zero but less than 2 mm. of Hg.

8. In a helium gas magnetometer having an absorption cell containing $He^4$ metastable $2^3S_1$ atoms and a first lamp containing substantially pure $He^4$ gas for providing a first source of resonance radiation impinging on said metasable atoms within said cell, the improvement comprising a second lamp cotaining substantially pure $He^3$ gas positioned adjacent said first lamp for providing a second source of resonance radiation impinging on said metastable atoms within said cell, said second lamp containing said $He^3$ gas at a pressure of about 8 mm. of Hg and said first lamp containing said $He^4$ gas at a pressure of about 1 mm. of Hg, the ratio of intensity of the resonance radiation from said first lamp to the intensity of the resonance radiation from said second lamp being about 3:1.

9. In a helium gas magnetometer having an absorption cell containing $He^4$ metastable $2^3S_1$ atoms and a first lamp containing substantially pure $He^4$ gas for providing a source of resonance radiation impinging on said metastable atoms within said cell, the improvement comprising a second lamp containing substantially pure $He^3$ gas positioned on the opposite side of said absorption cell as said first lamp and on an optical axis with said first lamp and said cell, said second lamp providing a second source of resonance radiation impinging on said metastable atoms within said cell.

References Cited by the Examiner

Cohen and Tannoudji, Academie des Sciences, Comptes Rendus, vol. 252, No. 3, Jan. 16, 1961, pp. 394–396 incl.

Colgrove et al., Physical Review, vol. 119, No. 2, July 1960, pp. 680–690 incl.

De Bolt, Electronics, vol. 33, No. 15, April 8, 1960, pp. 55–58 incl.

Egginghaus, Annalen der Physik, vol. 7, 1930, pp. 267–275 incl.

Keesom, Helium, published by Elsevier, New York, 1942, pp. 466, 468, and 476 relied on.

Rice, I.R.E. International Convention Record, vol. 9, pt. 9, March 1961, pp. 244–248 incl.

Wehr, Physical Review, vol. 39, No. 5, March 1, 1932, pp. 796–801 incl.

CHESTER L. JUSTUS, *Primary Examiner.*

MAYNARD R. WILBUR, *Examiner.*